United States Patent [19]
Difulvio et al.

[11] 3,726,589
[45] Apr. 10, 1973

[54] CONVERTIBLE DOCUMENT FEEDER AND FLEXIBLE LIGHT SHIELD

[75] Inventors: Anthony P. Difulvio; William C. Wilson, both of Rochester; Hans O. Stoever, Rush, all of N.Y.

[73] Assignee: Eastman Kodak Company, Rochester, N.Y.

[22] Filed: Nov. 5, 1971

[21] Appl. No.: 195,989

[52] U.S. Cl. ................355/64, 355/25, 355/75, 355/82
[51] Int. Cl. ...........................G03b 27/34
[58] Field of Search..............355/25, 64, 65, 66, 355/75, 82

[56] References Cited

UNITED STATES PATENTS

| | | | |
|---|---|---|---|
| 3,510,218 | 5/1970 | Limberger et al. | 355/66 X |
| 1,856,445 | 5/1932 | Tauschek | 355/65 X |
| 2,213,734 | 9/1940 | Hopkins | 355/64 |
| 2,536,289 | 1/1951 | Johnson et al. | 355/64 |
| 3,195,430 | 7/1965 | Young | 355/25 X |
| 3,206,307 | 9/1965 | Ludwig | 355/82 X |
| 3,498,710 | 3/1970 | Fox et al. | 355/65 X |

Primary Examiner—Samuel S. Matthews
Assistant Examiner—E. M. Bero
Attorney—W. H. J. Kline et al.

[57] ABSTRACT

A document feeder which is used to transport a plurality of documents in a programmed sequence to the exposure platen of a copying machine is pivoted from a use position overlying the exposure platen to a storage or non-use position in which the exposure platen is accessible to expose books or individual documents. A retractable auxiliary light shield is stored wrapped on a spring loaded storage spool mounted within the housing of the copying machine when the document feeder is in its operative position overlying the exposure platen. When the document feeder is moved to its non-use position, the light shield is pulled out against the bias of the spring to the desired length and it is automatically locked out by a ratchet and pawl device. A magnetic hem is provided in the free end of the light shield which is attracted to and held against the frame and housing of the copying machine during single document exposure. To rewind the light shield onto the storage spool, the pawl is disengaged from the ratchet and the spool then rotates under the force of the spring to rewind the light shield about the core of the spool.

4 Claims, 4 Drawing Figures

WILLIAM C. WILSON
ANTHONY P. DIFULVIO
HANS O. STOEVER
INVENTORS

ATTORNEYS

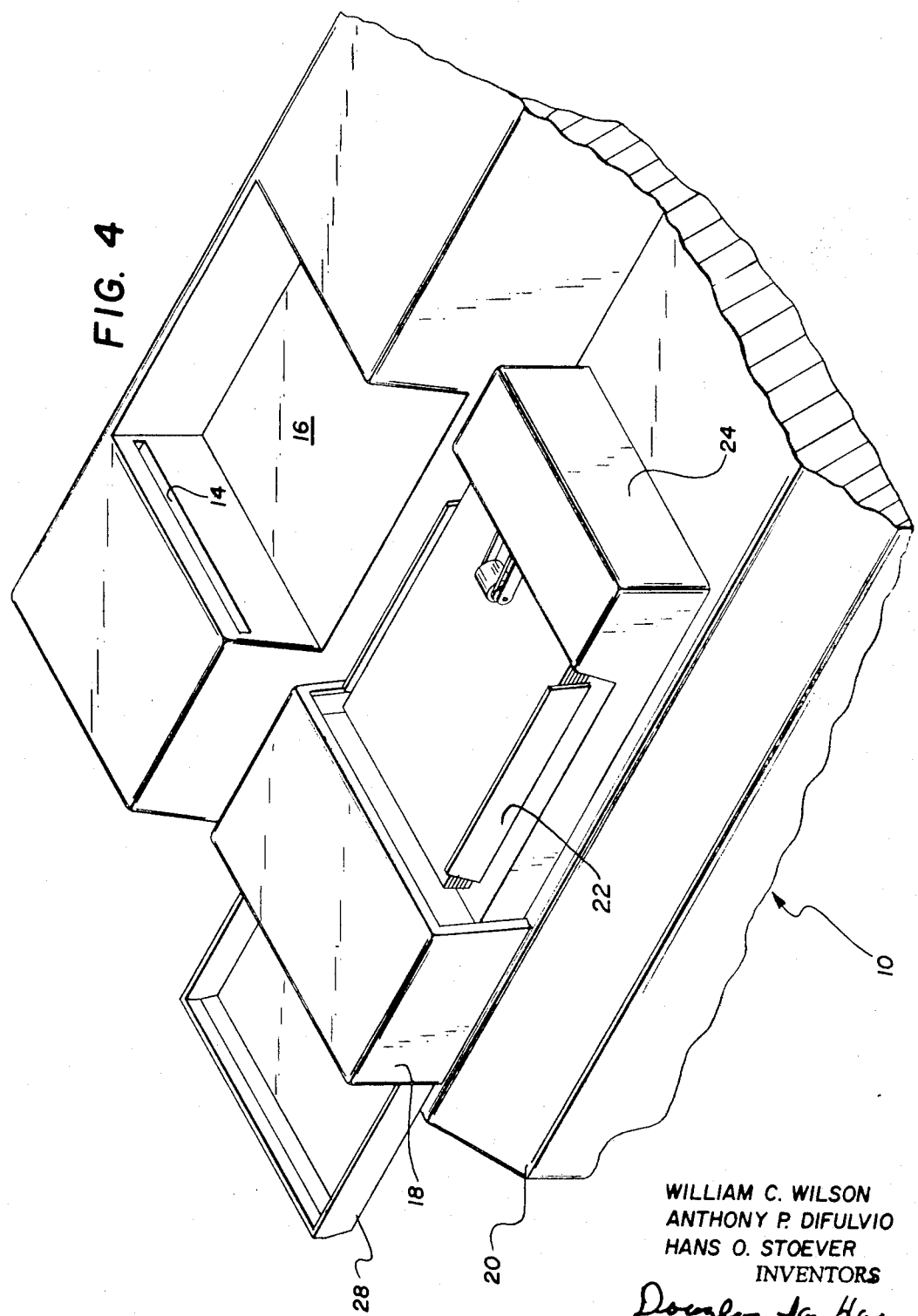

CONVERTIBLE DOCUMENT FEEDER AND FLEXIBLE LIGHT SHIELD

CROSS REFERENCE TO RELATED APPLICATIONS

Reference is made to commonly assigned U.S. patent application Ser. No. 195,988 entitled "Document Feeding Apparatus" filed on even date herewith in the names of Taylor and Brooks.

BACKGROUND OF THE INVENTION

1. Field of the Invention

The invention relates to document handling and feeding apparatus and, more particularly, to document feeding and handling apparatus for processing documents through the exposure area of a copying machine, the documents being either a plurality of discrete elements fed seriatim through the exposure area or single elements such as the pages of a book individually fed through the exposure area.

2. Description of the Prior Art

Automatic copying machines, for example electrophotographic copying machines, wherein the document to be reproduced is manually placed upon an exposure platen located at the top of the machine and exposed onto a photosensitive medium are well known in the art. To protect the machine operator from the exposure illumination and to block ambient light from the copying mechanism of the machine, a light cover is frequently provided for placement over the document and the exposure platen during the exposure process. Copying machines of this type are advantageously employed to copy single documents or the pages of a book.

It is also known in the art to attach a document feeder to the frame or housing of such copying machines for use in applications in which a large number of discrete documents are to be copied. The document feeder transports the documents in a programmed sequence to the exposure platen, actuates the copying machine to reproduce the documents, and then feeds the documents to an output receptacle. A description of a document feeder accessory for use with copying machines of the above mentioned type, can be found in U.S. Pat. No. 3,499,710 to Sahley. As disclosed in this patent, the document feeder has a frame supported on the copying machine so that at least a portion thereof overlies the exposure platen and the overlying portion can be readily moved away from the exposure platen to provide for freeing a jammed document or to manually position a book or the like on the platen.

Since the document feeder accessory in its mounted and operative position on the frame and the housing of the copying machine overlies the exposure platen, any light cover provided with the copying machine and normally positioned over the exposure plate must be removed therefrom so that it will not interfere with the feeding process of the document feeder. In its operative mode overlying the exposure platen the document feeder itself functions as a light cover to block the entrance of ambient light and to shield the exposure illumination. However, when the document feeder is moved away from the exposure window to permit the exposure of books or individual documents, the ambient light surrounding the exposure platen may reduce the quality of the copy produced by the copying machine and an operator subjected to the exposure illumination may find the illumination irritating or even harmful.

SUMMARY OF THE INVENTION

It is therefore the primary object of the invention to provide apparatus to facilitate changing the configuration of document feeding and handling apparatus to conform to the particular character of the document being processed.

Another object of the invention is to improve document feeding and handling apparatus movable between a use position overlying the exposure platen of a copying machine and a storage position remote from the platen by providing an auxiliary light cover apparatus which is positionable over the platen when the feeding and handling apparatus is moved to its storage position.

Another object of the invention is to provide document feeding and handling apparatus for a copying machine which is of simple design and construction, thoroughly efficient and reliable in operation and economical to manufacture.

These and other objects are accomplished, in accordance with the present invention, by providing apparatus having means for moving a document feeder operatively positioned over the exposure platen of a copying machine to a non-use position away from the exposure platen and a retractable light cover positionable over the exposure platen when the document feeder is moved to its non-use position.

In a preferred embodiment of the invention, the apparatus includes a pivoted mounting arrangement which allows the portion of the document feeder overlying the exposure platen to be pivoted 90° to a storage or non-use position. A latch automatically engages the pivoted feeder at 90° rotation and is released by a latch release. A retractable auxiliary light cover is stored wrapped on a spring loaded storage spool mounted within the housing of the copying machine when the document feeder is in its operative position overlying the exposure platen. When the document feeder is moved to its non-use position, the light cover is pulled out to the desired length and it is automatically locked out by a ratchet and pawl device. To release the cover for rewind to its storage mode, a cover lock release is activated.

The organization and method of operation of the invention together with further objects and advantages will become more apparent in the detailed description of the preferred embodiment which follows.

BRIEF DESCRIPTION OF THE DRAWINGS

In the detailed description of the preferred embodiment presented below, reference is made to the accompanying drawings wherein corresponding parts are identified by like numerals and in which:

FIG. 4 is a view similar to FIG. 1 but showing the document feeder in its operative position overlying the exposure platen of the copying machine.

DESCRIPTION OF THE PREFERRED EMBODIMENT

Figure 1:
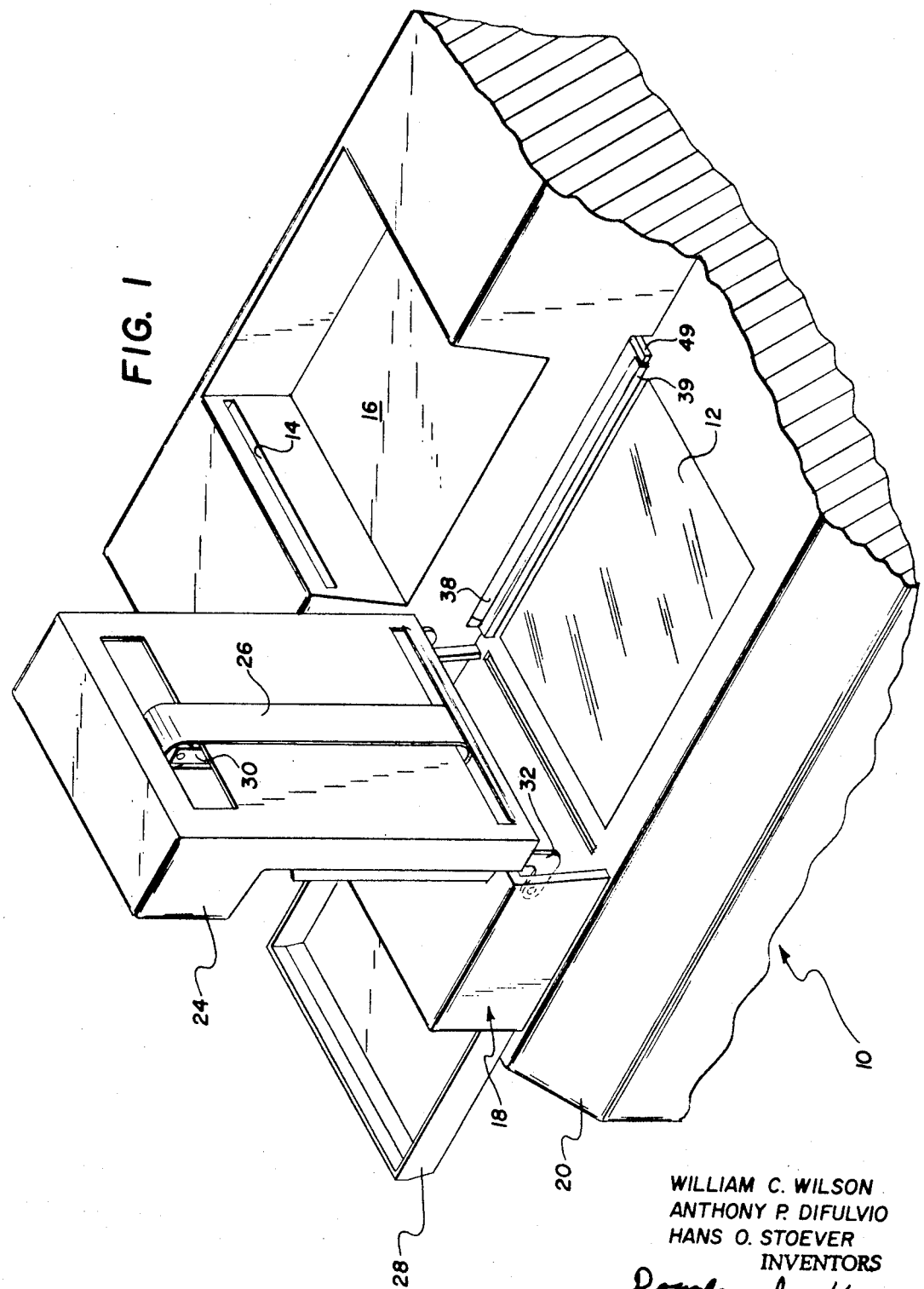
FIG. 1 is a perspective view of a portion of a conventional electrophotographic copying machine embodying the invention.

Referring now to the drawings, and in particular to FIG. 1, there is shown a conventional electrophotographic copying machine 10 having an exposure platen or window 12 through which a document to be copied is exposed to the copying mechanism (not shown) of the machine 10. Upon actuation of the copying machine 10, an image of the document positioned on the exposure platen 12 is projected onto a photosensitive medium (not shown). The image so projected is processed to produce an electrophotographic copy of the document which is subsequently discharged from the copying machine 10 through an outlet 14 onto a receiving shelf 16.

A document feeder 18 is mounted as shown on the frame and housing 20 of the copying machine 10. The document feeder 18 which is described and claimed in copending application Ser. No. 195,988 filed on Nov. 5, 1971, in the names of Taylor and Brooks, is used in applications in which a plurality of individual documents are to be copied in a programmed sequence. The following brief description of the document feeder 18 is believed sufficient for an understanding of its operation in the overall system shown and claimed herein but reference to said copending application should be made if further details are desired.

In the operative position of the document feeder 18 shown in FIG. 4, a stack of documents (not shown) is loaded into the supply hopper 22. When the document feeder 18 is energized, a document is fed from the top of the stack through a turn-around assembly 24 up to the entrance to the exposure platen 12. After a brief hesitation determined by control circuitry (not shown), the document is moved by a conveyor assembly 30, including conveyor belt 26, across the exposure platen 12 to a rest position where the document pauses again for exposure. During the feeding of the document across the exposure platen 12, a second document is fed from the top of the stack up to the entrance to the exposure platen 12 and this document remains in stand-by. The document overlying the exposure platen 12 is copied and then fed into a receiving hopper 28. The second document in stand-by is then transported by the conveyor belt 26 across the exposure platen 12 to the rest position and pauses for exposure. The process is repeated until all of the documents in the document stack have been copied.

Figure 2:
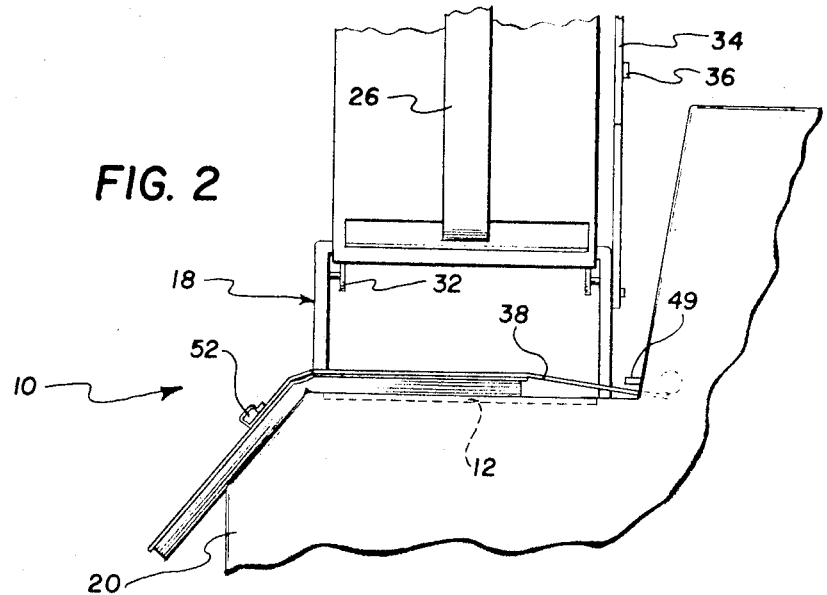
FIG. 2 is an end view of the apparatus shown in FIG. 1 illustrating use of the invention for book exposure.

If a single document or a book is to be exposed to the copying mechanism of the copying machine 10, the conveyor assembly 30 and the turn-around mechanism 24 of the document feeder 18 are pivoted upwardly about a yoke 32, as shown in FIGS. 1 and 2, to a storage or non-use position so that the document or book to be copied can be placed by the operator directly on the exposure platen 12. The pivoted conveyor assembly 30 and turn-around assembly 24 are counterbalanced such that the rotational moment sum allows a clockwise moment when the apparatus is up and a counterclockwise moment when the apparatus is down as viewed in FIG. 4. The apparatus passes through equilibrium as it is pivoted. A support and latch device 34 is provided to guard against inadvertently applied rotational energy. The latch and support device 34 automatically engages at 90° rotation and is released using the latch release 36.

In its operative position overlying the exposure platen 12, the document feeder blocks ambient light from reaching the exposure platen 12 and hides the exposure illumination. However, when the copying machine 10 is used without the document feeder 18, i.e., when the document feeder is pivoted to its non-use position, the exposure platen 12 is uncovered. The present invention, therefore, advantageously includes an auxiliary light shield or cover 38 which is positionable over the exposure platen 12 during the single document or book exposure mode of operation. The light shield 38 blocks ambient light from the exposure platen 12 and provides protection to the operator from the exposure light source (not shown).

During the operative mode of the document feeder 18, the auxiliary light shield 38 is stored within the machine housing 20, wrapped around a rotatable storage spool 40. The wrapped condition of the light shield 38 is achieved by fixedly attaching one end thereof to an outer core 46 of the spool 40 and providing a spring 44 wrapped around the central shaft 42 of the spool 40. The spring 44 rotates the spool 40 in a clockwise direction as viewed in FIG. 3 to wind the light shield 38 about the core 46. For usage, the free end 39 of the light shield 38 is pulled out against the bias of the spring 44 to the desired length. The light shield 38 is prevented from rewinding on the core 46 by a pawl 48 which engages a ratchet 50 on shaft 42 as shown.

A magnetic hem 52 is provided in the free end 39 of the light shield 38 which is attracted to and held against the frame and housing 20 of the copying machine 10 during single document exposure. The magnetic hem 52 prevents movement of the light shield 38 and this in turn assists in holding the document to be copied stationary in proper position on the exposure platen 12 for exposure to the copying mechanism of the copying machine 10. During book exposure, the holding function of the magnetic hem 52 is negated as shown in FIG. 2.

Figure 3:
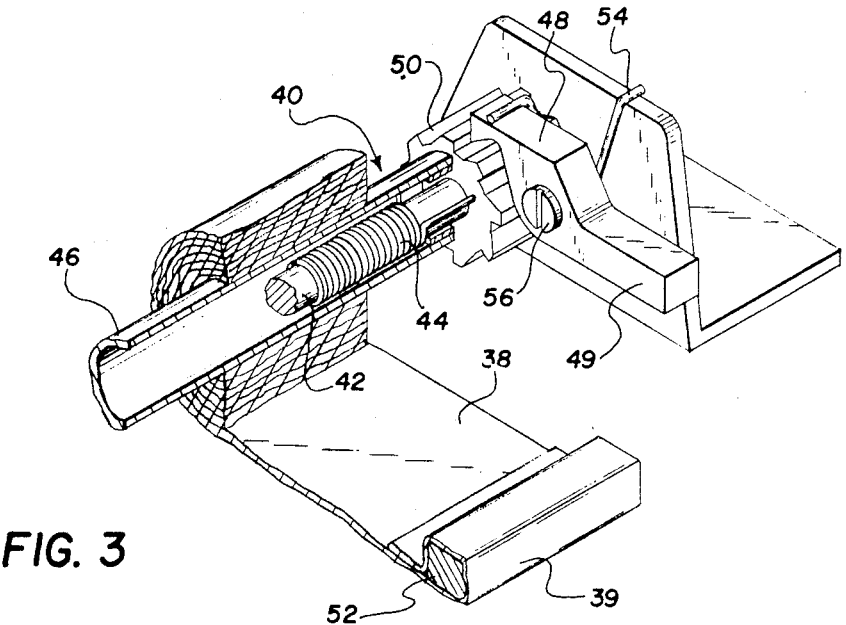
FIG. 3 is a fragmentary perspective view partially broken away showing further details of the auxiliary light cover.

To rewind the light shield 38 onto the core 46 of the storage spool 40, extension 49 of the pawl 48 is pushed downwardly as viewed in FIG. 3 against the bias of a leg spring 54. The downward force applied to extension 49 causes the pawl 48 to rotate in a counterclockwise direction about a mounting screw 56 and to disengage from the ratchet 50. When the pawl 48 and ratchet 50 disengage, the storage spool 40 rotates under the force of spring 44 in a clockwise direction as viewed in FIG. 3 to rewind the light shield 38 about the core 46 of the spool 40.

From the foregoing, the advantages of the present invention are readily apparent. A copying machine having a document handling and feeding accessory mounted thereon and overlying the exposure platen is provided with apparatus which changes the configuration of the processing station to permit the processing of documents which may be either discrete elements fed in seriatim or single elements such as the pages of a book. To block ambient light which may reduce the quality of the copy produced by the machine from reaching the exposure platen and to protect the operator from the exposure illumination, a retractable light shield is provided to cover the exposure platen during single document exposure.

The invention has been described in detail with reference to a preferred embodiment thereof, but it will be understood that variations and modifications can be effected within the spirit and scope of the invention.

I claim:

1. In document copying apparatus of the type having a document exposure platen, the improvement comprising:
   a. a document feeding assembly including means for supporting documents to be copied and means for feeding documents from said supporting means along a document feed path and across said exposure platen in a first direction;
   b. means for pivotably mounting said document feeding assembly on said copying apparatus for movement between a document feeding position overlying said exposure platen and a manual document-placement position in which the exposure platen is uncovered, said feeding assembly being pivotal about an axis which extends across said feed path and is generally orthogonal with respect to said first direction; and
   c. a light shield assembly including:
      1. a shaft mounted on said copying apparatus adjacent said exposure platen for rotation about an axis generally parallel with respect to said first direction;
      2. a web of flexible opaque material attached along an edge to said shaft and of size to cover said exposure platen; and
      3. means for winding said web into a coiled configuration around said shaft.

2. Apparatus as claimed in claim 1, wherein said light shield assembly further includes magnetic means for holding said light cover means in an uncoiled position over the exposure platen.

3. Apparatus as claimed in claim 1, wherein said light shield assembly further includes lock means automatically actuated when the free end of said web is pulled out to the desired length for preventing said winding means from rewinding said web onto said shaft.

4. In an electrophotographic copying machine including a supporting frame, the frame having an exposure platen therein, and a document feeder assembly mounted on the frame and selectively movable between an operative position overlying the exposure platen whereat a plurality of discrete documents loaded into the document feeder are fed along a document feed path in programmed sequence to the exposure platen and a non-operative position spaced from the exposure platen, auxiliary light cover apparatus operative when the document feeder is moved to its non-operative position, said auxiliary apparatus comprising:
   a. a support member;
   b. a spool mounted on said support member adjacent the exposure platen for rotation about an axis generally parallel to the document feed path, said spool including:
      1. a hollow cylindrical core,
      2. a shaft centrally disposed in said core, and
      3. a spring wrapped around said shaft, one end of said spring being fixedly attached to said support member;
   c. a light cover having two opposed end portions, said light cover being formed of a flexible, opaque material, one of said end portions being fixedly attached to said core, said spring biasing said spool for rotation in a manner such that said light cover is wrapped around said core;
   d. a ratchet mounted on said shaft;
   e. a pawl mounted on said support member; and
   f. biasing means for urging said pawl and said ratchet into engagement, said pawl and said ratchet cooperating to lock said light cover in a position overlying the exposure platen when said light cover is pulled to said overlying position against the bias of said spring.

* * * * *